United States Patent
Miraniuk

(10) Patent No.: US 10,970,086 B1
(45) Date of Patent: Apr. 6, 2021

(54) EFFICIENT USE OF RAM IN RESOURCE-CONSTRAINED EMBEDDED SYSTEMS

(71) Applicant: SK hynix Inc., Gyeonggi-do (KR)

(72) Inventor: Ihar Miraniuk, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/737,651

(22) Filed: Jan. 8, 2020

(51) Int. Cl.
```
G06F 9/34       (2018.01)
G06F 9/448      (2018.01)
G06F 3/06       (2006.01)
G06F 9/30       (2018.01)
```

(52) U.S. Cl.
CPC ........... *G06F 9/4484* (2018.02); *G06F 3/064* (2013.01); *G06F 3/0679* (2013.01); *G06F 9/30196* (2013.01); *G06F 3/0605* (2013.01); *G06F 3/0659* (2013.01)

(58) Field of Classification Search
CPC ...................................... G06F 9/342
USPC ...................................... 711/212
See application file for complete search history.

(56) References Cited

U.S. PATENT DOCUMENTS

| | | | | |
|---|---|---|---|---|
| 8,656,139 B2 * | 2/2014 | Meier | ............... | G06F 9/342 711/212 |
| 10,585,790 B2 * | 3/2020 | Gschwind | ............... | G06F 8/443 |
| 2019/0220281 A1 | 7/2019 | Gschwind | | |

OTHER PUBLICATIONS

Ker-Munslow D., Advantages and Pitfalls of Moving from an 8 bit System to 32 bit Architectures, May 2010, pp. 1-8, ERTS2010, Toulouse, France.
Davis R et al., How Embedded Applications using an RTOS can stay within On-chip Memory Limits, Proceedings of the Work in Progress and Industrial Experience Session, Euromicro Conference on RealTime Systems, 2000.
WG14/N1256, ISO/IEC 9899:TC3, Committee Draft-Sep. 7, 2007.

* cited by examiner

*Primary Examiner* — Andy Ho
(74) *Attorney, Agent, or Firm* — IP & T Group LLP

(57) ABSTRACT

Short pointers are used for more efficient utilization of random access memory (RAM) in resource-constrained embedded systems. Such a system includes a processor having an address space; and a RAM that stores variables used by the processor, including pointer variables. The processor has X-bit architecture, and a standard C/C++ (native) pointer variable occupies X bits in RAM. In such a system, select pointers are stored in RAM in a form of short pointer variables as respective Y-bit segments, instead of as standard C/C++ pointer variables that would be stored as X-bit segments, where Y is less than X. Select short pointers are converted to respective native pointers to perform an operation in the memory system for which pointers are used. After the operation is performed, each native pointer is converted back to the corresponding short pointer and stored in the RAM.

11 Claims, 9 Drawing Sheets

FIG. 4

C version define RAM_BASE_ADDRESS              (0)
define SHORT_PTR_TYPE(type)          uint16_t
define SHORT_PTR_DECL(type, name)    SHORT_PTR_TYPE(type) name
define GET_SHORT_PTR(ptr)            ((SHORT_PTR_TYPE(void))
((uintptr_t)(ptr) - RAM_BASE_ADDRESS))
define SHORT_PTR_TO_NATIVE_PTR(short_ptr, type) ((type) ((short_ptr) +
RAM_BASE_ADDRESS))

FIG. 5

C++ version

```
template<class T, class short_uintptr_t=uint16_t, uintptr_t ram_base_addr=0>
class short_ptr_t
{
    short_uintptr_t address;
    short_uintptr_t native_to_short(T* native_ptr) { return
static_cast<short_uintptr_t>(reinterpret_cast<uintptr_t>(native_ptr) -
ram_base_addr); }
public:
    T* get_native_ptr() { return
reinterpret_cast<T*>(static_cast<uintptr_t>(address) + ram_base_addr); }
    T& operator *() { return *get_native_ptr(); }
    T* operator ->() { return get_native_ptr(); }
    T* operator =(T* native_ptr) { address = native_to_short(native_ptr); return
native_ptr; }
    T* operator +(int ofs) { return get_native_ptr() + ofs; }
};
```

FIG. 7

|    | 0      3 | 4      7 | 8         15 |
|----|----------|----------|--------------|
| 0  | next     | prev     | payload      |
| 16 | next     | prev     | payload      |
| 32 | next     | prev     | payload      |
| 48 | next     | prev     | payload      |

FIG. 8

|    | 0 | 1 | 2 | 3 | 4 | | | | | | | 11 |
|----|---|---|---|---|---|---|---|---|---|---|---|---|
| 0  | next | | prev | | payload | | | | | | | |
| 12 | next | | prev | | payload | | | | | | | |
| 24 | next | | prev | | payload | | | | | | | |
| 36 | next | | prev | | payload | | | | | | | |

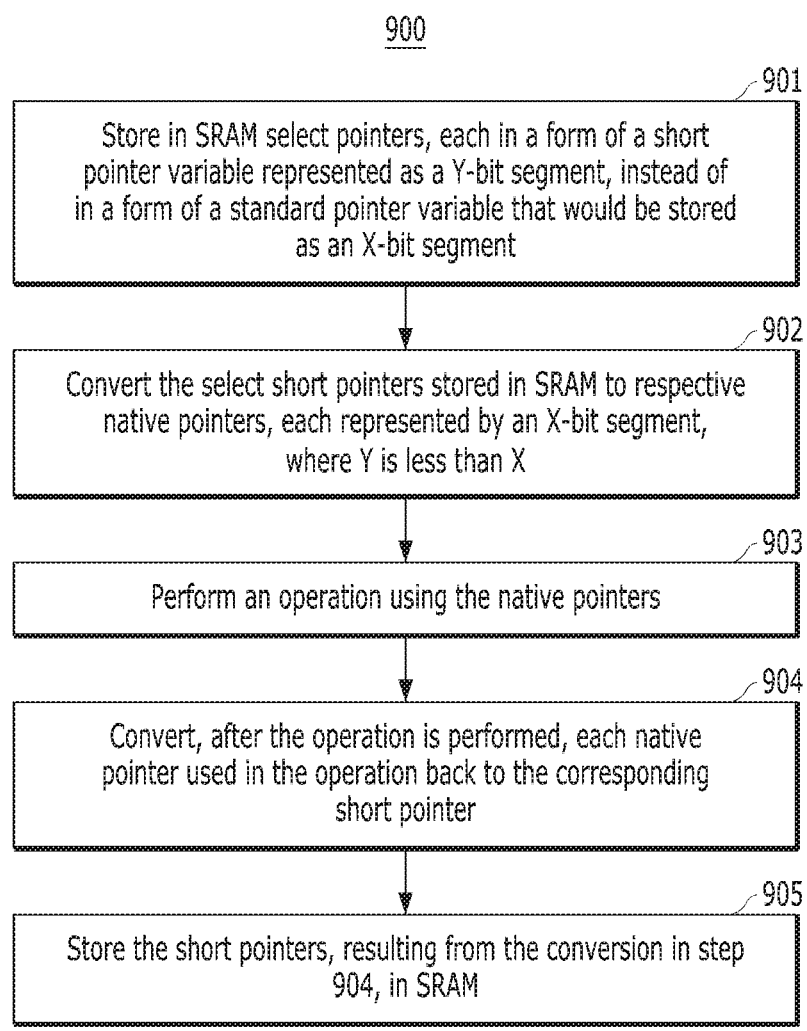

EFFICIENT USE OF RAM IN RESOURCE-CONSTRAINED EMBEDDED SYSTEMS

BACKGROUND

1. Field

Embodiments of the present disclosure relate to techniques of organizing data structures in a more compact way to more efficiently use random access memory (RAM), particularly in embedded systems.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller, which includes the electronics that bridge the flash memory components to the SSD input/output (I/O) interfaces. The SSD controller may include an embedded processor that executes functional components such as firmware. The SSD functional components are typically device specific, and in most cases, can be updated.

SSDs and other types of semiconductor memory systems, as well as other types of semiconductor devices, employ embedded systems, which often have real-time computing constraints. Resource-constrained embedded systems have very low margins in terms of computational resources (CPU time, RAM size, ROM size, power, etc.) with respect to the minimum amount of resources necessary to meet the design requirements. In such constrained systems, much of the system-on-chip (SoC) area is often consumed by static RAM (SRAM) that stores firmware internal data (and in some cases, code).

Thus, more efficient use of SRAM may lead to reduction of both the required SRAM size and per-unit SoC production cost. In this context, embodiments of the present invention arise.

SUMMARY

An aspect of the present invention is directed to a memory system that comprises a processor having an address space; a random access memory (RAM) configured to store variables used by the processor, including pointer variables. Select pointers are stored in the RAM as short pointers, each in a form of a short pointer variable represented by a Y-bit segment. The select short pointers are converted to respective native pointers, each represented by an X-bit segment, to perform an operation in the memory system for which pointers are used, where Y is less than X, and after the operation is performed, each native pointer is converted back to the corresponding short pointer and stored in the RAM.

Other aspects of the present invention are directed to an embedded system with memory and a method of operating such system. Such method comprises storing, in random access memory (RAM), variables used by the processor, including pointer variables. Select pointers are stored in the RAM as short pointers, each in a form of a short pointer variable represented by a Y-bit segment. The method further comprises converting the select short pointers stored in RAM to respective native pointers, each represented by an X-bit segment, where Y is less than X; performing an operation in the embedded system using the native pointers; converting, after the operation is performed, each native pointer used in the operation back to the corresponding short pointer; and storing the short pointers, converted back from native pointers, in the RAM.

The RAM may be an SRAM.

Additional aspects of the present invention will become apparent from the following description.

BRIEF DESCRIPTION OF THE DRAWINGS

FIG. 4 shows a C language version of conversion and declaration routines for 16-bit short pointers in accordance with an embodiment of the present invention.

FIG. 5 shows a C++ implementation of an aspect of conversion and declaration routines for 16-bit short pointers in accordance with an embodiment of the present invention.

FIG. 7 is a representation a data memory layout for four double-linked list nodes using native pointers in accordance with an embodiment of the present invention.

FIG. 8 is a representation of a data memory layout for four double-linked list nodes using short pointers in accordance with an embodiment of the present invention.

FIG. 9 is a flow chart illustrating steps in processes of reducing SRAM size in an embedded system in accordance with embodiments of the present invention.

DETAILED DESCRIPTION

Figure 1:
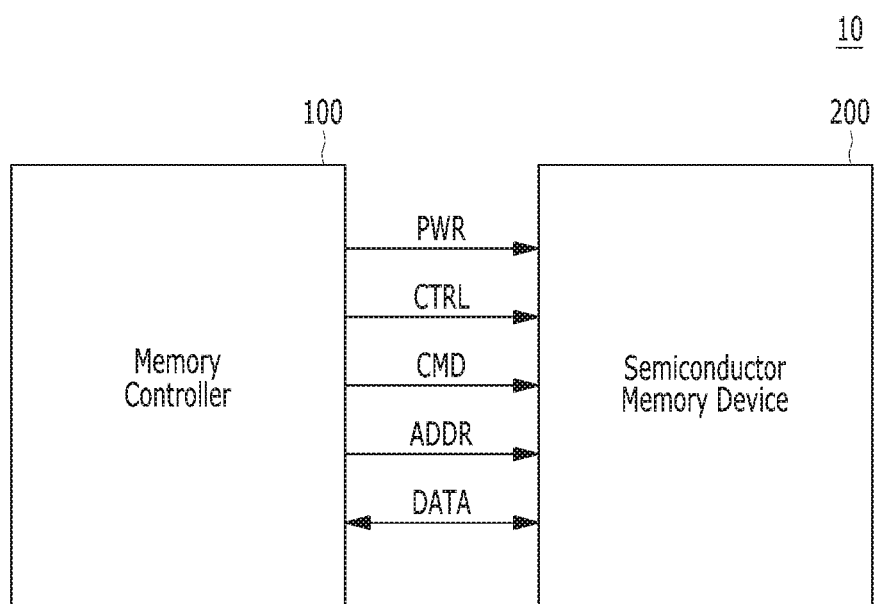
FIG. 1 is a block diagram illustrating a memory system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram schematically illustrating a memory system in accordance with an embodiment of the present invention.

Referring to FIG. 1, the memory system 10, which is an example of an embedded system, may include a memory controller 100 and a semiconductor memory device 200, which may represent more than one such device. The semiconductor memory device(s) 200 may be flash memory device(s), particularly of the NAND-type. For brevity, memory controller 100 and semiconductor memory device 200 are sometimes simply referred to below as controller 100 and memory device 200, respectively.

The controller 100 may control overall operations of the memory device 200.

The memory device 200 may perform one or more erase, program, and read operations under the control of the memory controller 100. The memory device 200 may receive a command CMD, an address ADDR and data DATA through input/output (I/O) lines. The memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the memory system 10 is used in an SSD, operation speed of a host (not shown) coupled to the memory system 10 may remarkably improve.

In another embodiment, the memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC) card, and/or a universal flash storage (UFS).

In still another embodiment, the memory system 10 may be provided as one of various components in an electronic device, such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
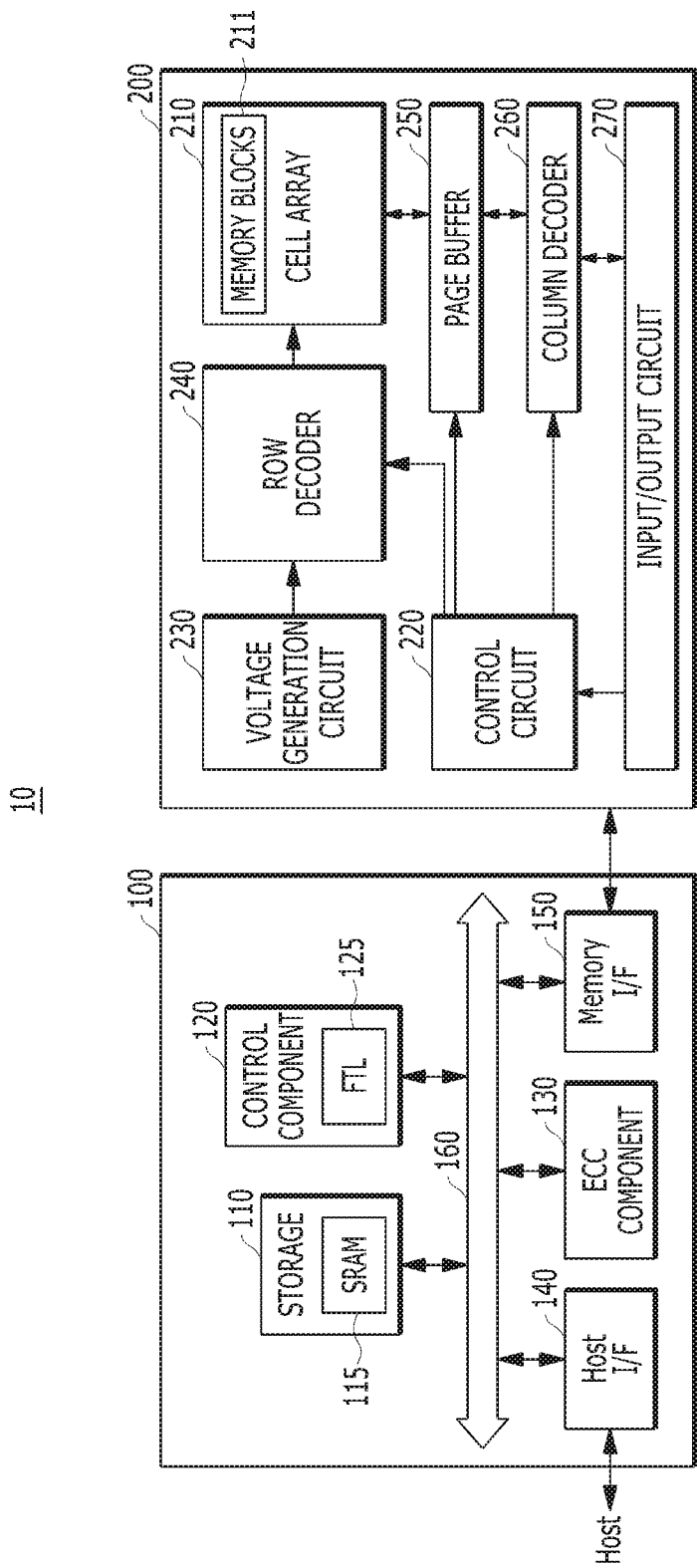
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device, such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device, such as a mobile phone, a smart phone, an e-book, an MP3 player, a portable multimedia player (PMP), and/or a portable game player.

The memory device 200 may store data to be accessed by the host device.

The memory device 200 may be implemented with a volatile memory device, such as a dynamic random access memory (DRAM) and/or a static random access memory (SRAM) or a non-volatile memory device, such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110 and a control component 120, which may be implemented as a processor, e.g., a central processing unit (CPU). The control component 120 may further include an error correction code (ECC) component 130, a host interface (I/F) 140 and a memory interface (I/F) 150. All such elements are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with, or include, a volatile memory such as a static random access memory (SRAM) 115. Storage 110 may also include a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware (FW), which is referred to as a flash translation layer (FTL) 125, to control general operations of the memory system 10. For example, the FTL 125 may perform operations, such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure to correct the error bits.

The ECC component 130 may perform an error correction operation based on a coded modulation, such as a low-density parity-check (LDPC) code including both regular and irregular LDPC codes, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a block coded modulation (BCM). Thus, the ECC component 130 may include any and all circuits, systems or devices for suitable error correction operation.

The host interface 140 may communicate with the host device through one or more of various interface protocols, such as a universal serial bus (USB), a multi-media card (MMC), a peripheral component interconnect express (PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component or CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer (array) 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
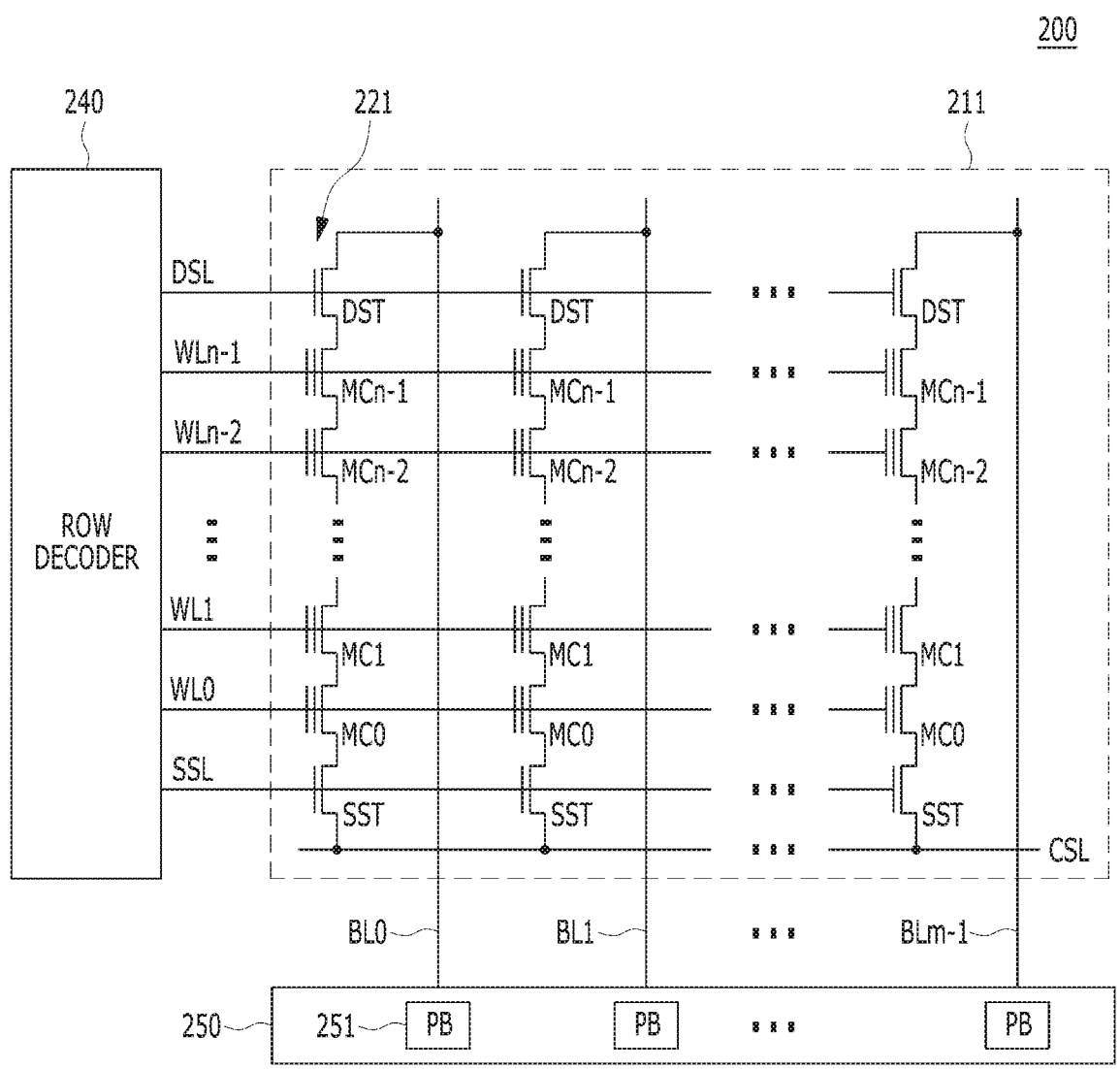
FIG. 3 is a circuit diagram illustrating a memory block of a memory device of a memory system in accordance with an embodiment of the present invention.

The page buffer (array) 250 may be in electrical communication with the memory cell array 210 through bit lines BL (shown in FIG. 3). The page buffer (array) 250 may pre-charge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer (array) 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

As previously noted, the page buffer 250 may be in the form of a page buffer array including a plurality of page buffers 251 that are coupled to the bit lines BL0 to BLm−1. The page buffers 251 may operate in response to page buffer control signals. For example, the page buffers 251 may temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

In various systems, such as those described above, data in SRAM 115 (SRAM data) typically consists of various dynamically changing data variables of different types. Many firmware data structures, such as linked lists, priority queues, trees, dictionaries, and other custom data structures use pointers (variables storing addresses of other data structures in CPU address space) for various purposes. Typically, pointer variables are stored in RAM, and the number of bits required to store a pointer variable is equal to a machine word size of a CPU that uses that RAM. Machine word size is the natural unit of data used by a particular processor design. Thus, pointers are typically stored using 32-bit segments for 32-bit CPUs. However, this is not efficient in some cases, because the entire SRAM for firmware data structures is addressable with a lesser number of bits.

In accordance with embodiments of the present invention, SRAM is utilized more efficiently. That is, data structures are organized in a more compact way, e.g., stored in a more compact format, to more efficiently use, or reduce the minimum required size of, SRAM and thus reduce per-unit system-on-chip (SoC) production cost and/or allow remaining, unused SRAM space to be used for other purposes. More specifically, in embodiments, pointer variables, which are internal components of many common data structures, are reduced, thus reducing total occupied SRAM space. Such technique is particularly applicable in resource-constrained embedded systems. Such technique becomes more practical and useful, as even the most resource-constrained replace 8-bit CPUs with 32-bit CPUs due to multiple significant advantages provided despite an insignificant increase of gate count.

In some systems, addresses of RAM objects can be represented in less number of bits compared to standard C/C++ pointer variables (as an example 16-bits per each pointer variable were used instead of 32-bits). So, according to embodiments of the present invention, pointer variables may be stored in RAM in a shorter (packed) form, compared to standard C/C++ pointer variables, thus reducing overall occupied amount of RAM. While aspects of the present invention are technically applicable to a wide range of systems, because of certain issues described below, it may be more applicable in some very specific systems.

In an SoC implementation, the SoC integrates all components including the CPU (processor) and SRAM.

Before describing additional details of the present invention, the following terms are introduced.

A native pointer type may be that type of pointer defined by the C language standard of WG14/N1256 Committee Draft—Sep. 7, 2007 ISO/IEC 9899.TC3, p. 540 [paragraph 6.2.5.20]. X bits are used to store this value (equal to a machine word size). Such pointer type may be derived from a function type, an object type, or an incomplete type, called the referenced type. A pointer type describes an object whose value provides a reference to an entity of the referenced type. A pointer type derived from the referenced type T may be called 'pointer to T'.

A short pointer type may represent the address of a variable in the CPU address space, logically having the same meaning as a native pointer, but being another type in terms of the C programming language (non-pointer type according to the C language standard), requiring Y bits for storage, where Y<X.

A native pointer may be a variable of a native pointer type, and a short pointer may a variable of a short pointer type.

According to an embodiment of the invention, Y bits are allocated per each short pointer variable, where Y<X (machine word size), and conversion rules between native pointers and short pointers are defined. Then, pointer variables are stored in SRAM 115 as short pointers, converted to native pointers to perform any standard C/C++ operations with pointers, and then converted again, if necessary, to short pointers before being written back to SRAM.

Conversion from a native pointer to a short pointer may comprise conversion of an address (if necessary) and a corresponding C/C++ type. Converting an address is required in a case in which RAM offset can be represented using Y-bits, but the absolute RAM address cannot be represented using Y-bits. For example, RAM is assigned to an address range 0x2000_0000 . . . 0x2000_FFFF in a CPU address space. RAM offset can be represented using Y=16 bits, but the absolute RAM address cannot be represented using Y=16 bits. Thus in this case, conversion from a native pointer to a short pointer includes subtracting the RAM base address (0x2000_0000). So, for a native pointer containing address 0x2000_5124, the corresponding short pointer would hold a value 0x5124. Converting a variable type is performed using C/C++ type casting operation from a C/C++ pointer type to an integer type chosen to represent a short pointer (which has Y-bits in its binary representation) such as uint16_t.

Conversion from a short pointer to a native pointer may also include converting an address (if necessary) and corresponding C/C++ type. Converting an address can be done by adding the RAM base address. For the example above, that means adding 0x2000_0000 to a short pointer address. Conversion of a variable type from a short pointer to a native pointer again is performed using C/C++ type casting operation from an integer type chosen to represent a short pointer such as uint16_t to a standard C/C++ pointer type.

It is important to note that the address conversion described above may add significant CPU performance overhead. Thus, it is more practical if the system is designed so that RAM is located from address 0 in CPU address space (see FIG. 6). In this case, the short pointer address and the native pointer address are equal, and thus the address conversion step is not necessary. C/C++ type conversion step adds minimum or zero CPU performance overhead if CPU architecture supports efficient operations with a type chosen for a short pointer type.

The conversion rules described above can be implemented in a C or C++ code as shown in FIGS. 4 and 5.

To use short pointers as described above, the following functions are used: (1) short pointer declaration; (2) conversion from a short pointer to a native pointer; and (3) conversion from a native pointer to a short pointer.

To implement the technique described above, data of the SRAM 115 is preferably located in the lower $2^Y$ bytes of a CPU address space. For an internally developed SoC, this requirement should be used as an SoC design input. Also, the source code is preferably implemented in C, C++, or Assembly language. The CPU, memory/bus architecture, and compiler should support efficient Y-bit read/write accesses to the SRAM 115. Although the described technique is feasible even if this latter condition is not satisfied, the data size reduction may not be sufficient to offset performance overhead.

In an embodiment, conversion and declaration routines may be implemented in C language for 16-bit short pointers as set forth in FIG. 4. This implementation raises the following issues: (a) breaking type safety due to explicit type conversions; (b) initialization of a static short pointer with a non-zero value does not comply to the above-identified C language standard; and (c) debugging may be difficult because the debugging software may not be aware of such pointers and thus will display them as plain numbers.

Issue (a) can be completely resolved by using the C++ implementation shown in FIG. 5. Templates and operators overloading features allow providing pointer-like syntax having the address stored internally in integral-type and preserving-type checking, in which a short pointer size is selected using the second template parameter, as indicated in the C++ fragment of FIG. 5.

Because of issue (b), short pointers with non-zero initial values are configured to use run-time initialization instead of static initialization. In this case, the code size is increased. This is acceptable for some systems, in which there is a separate, less expensive memory for code compared to data (for example, ROM or flash memory). In other cases, the code may be located in the same memory as data, and data size reduction will be hidden as a result of the increase in code size due to run-time initialization. In this case, run-time initialization code may be loaded and unloaded dynamically (using the overlaying technique) minimizing additional memory overhead.

Issue (c) can be at least partially resolved by automatic conversion of short pointers to native pointers. For example, an automated script may be used to scan source code files, find all used short pointer variable names, generate another script that can be used by debugger software, instruct it to perform type casting of all used short pointer variables to their corresponding native (standard C/C++) pointer types that can be recognized by debugger software, and then display them. Specific implementation depends on the particular debugger software that is used.

Figure 6:
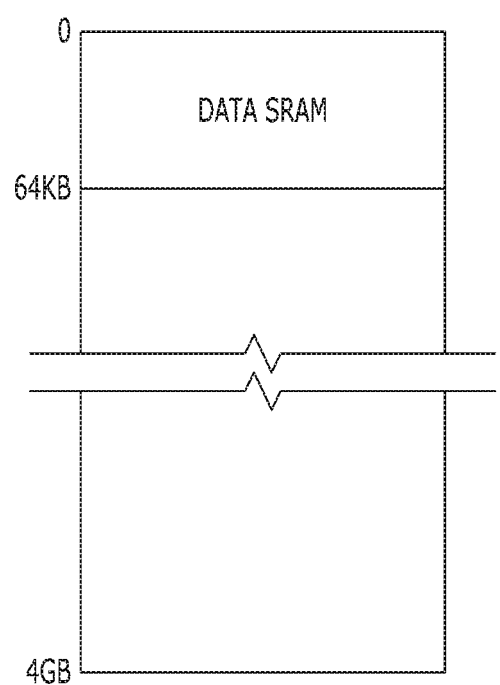
FIG. 6 is a schematic diagram illustrating an address space of a 32-bit central processing unit (CPU) in accordance with an embodiment of the present invention.

Techniques according to embodiments of the invention can be implemented with a CPU having an ARMv6-M architecture. In such a system, data or data/code may be located at addresses [0 . . . 65535] in CPU address space. In this example, the machine word size, X, is 32 bits and the short pointer size, Y, is 16 bits. An example of such an address space is shown in FIG. 6. As shown, in an address space of a 32-bit CPU, data is located in the lower 64 KB.

FIG. 7 illustrates data size reduction using a technique in accordance with an embodiment of the invention. A data memory layout for a double-linked list with four nodes is shown in FIG. 7. Each double-linked list node consists of three variables: next node pointer (next), previous node pointer (prev), and payload. Payload occupies eight bytes, the next and previous node pointers are native 32-bit pointers; thus, each occupies four bytes each. Therefore, node size is 16 bytes and the total structure size is 64 bytes.

In another embodiment, as shown in the data memory layout in FIG. 8, if the next and previous node pointers are stored as short 16-bits pointers, then each pointer size is 2 bytes and payload size is still 8 bytes. Thus, node size is 12 bytes and the total structure size is 48 bytes, which means that the required memory size is reduced by 25%.

FIG. 9 is a flow chart 900 describing steps in processes of reducing SRAM size in a system, e.g., embedded system, in accordance with embodiments of the present invention. The steps shown in flow chart 900 are exemplary. Those skilled in the art will understand that additional and/or alternative steps may be performed, or that the order of steps may be changed, to effectuate aspects of the present invention without departing from the inventive concepts disclosed herein. Various components consistent with the teachings herein may be used to carry out the processing in accordance with embodiments of the present invention.

Referring to FIG. 9, with secondary reference to other figures, at step 901, select pointers are stored in RAM, e.g., SRAM, of the system as short pointers. Each of the short pointers is stored in the form of a short pointer variable in SRAM. Each short pointer variable is stored as a Y-bit segment, which is less than an X-bit segment that would be used to store each of the pointers in a form of a standard pointer variable.

At step 902, the select short pointers stored in SRAM are converted to respective native pointers, each represented by an X-bit segment, where Y is less than X. The native pointers are used to perform an operation of the system in step 903.

After the operation is performed, at step 904, each of the native pointers used in the operation is converted back to the corresponding short pointer. Those short pointers, resulting from the conversion in step 904, are then stored in SRAM in step 905.

As explained above, aspects of the present invention provide various advantages including reducing required SRAM size in a system, e.g., memory system, particularly an embedded system with low computational margins.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:
1. A memory system, comprising:
a processor having an address space;
a random access memory (RAM) configured to store variables used by the processor, including pointer vari- ables, select pointers being stored in the RAM as short pointers, each in a form of a short pointer variable represented by a Y-bit segment; wherein native pointers are stored after being shortened to respective short pointers;

the short pointers are converted to their respective native pointers, each represented by an X-bit segment, to perform an operation in the memory system for which pointers are used, where Y is less than X, the operation is performed in the memory system using the native pointers, and after the operation is performed, each native pointer is converted back to the corresponding short pointer and stored in the RAM.

2. The memory system of claim 1, wherein the RAM includes a static RAM (SRAM).

3. The memory system of claim 2, wherein data in the SRAM is located in $2^Y$ bytes of the processor address space.

4. The memory system of claim 1, wherein Y is 16 bits.

5. An embedded system including memory, comprising:
a processor having an address space; and
a static random access memory (SRAM) configured to store variables used by the processor, including pointer variables, select pointers being stored in the SRAM as short pointers, each in a form of a short pointer variable represented by a Y-bit segment; wherein native pointers are stored after being shortened to respective short pointers;

the short pointers are converted to their respective native pointers, each represented by an X-bit segment, to perform an operation in the embedded system for which pointers are used, where Y is less than X, the operation is performed in the memory system using the native pointers, and after the operation is performed, each native pointer is converted back to the corresponding short pointer and stored in the SRAM.

6. The embedded system of claim 5, wherein the processor and SRAM are embodied as a system-on-chip (SoC).

7. The embedded system of claim 5, wherein data in the SRAM is located in $2^Y$ bytes of the processor address space.

8. The embedded system of claim 5, wherein Y is 16 bits.

9. A method of operating an embedded system, comprising:

storing, in random access memory (RAM), variables used by a processor, including pointer variables, wherein select pointers are stored in the RAM as short pointers, each in a form of a short pointer variable represented by a Y-bit segment;

storing native pointers after shortening the native pointers to respective short pointers;

converting the short pointers stored in RAM to respective native pointers, each represented by an X-bit segment, where Y is less than X;

performing an operation in the embedded system using the native pointers;

converting, after the operation is performed, each native pointer used in the operation back to the corresponding short pointer; and storing the short pointers, converted back from native pointers, in the RAM.

10. The method of claim 9, further comprising:
defining one or more conversion rules for converting the short pointers stored in RAM to the respective native pointers.

11. The method of claim 9, further comprising:
defining one or more conversion rules for converting, after the operation is performed, each native pointer used in the operation back to the corresponding short pointer.

* * * * *